3,122,210
FOLDABLE HARROW FRAME WITH HARROW
SECTION ELEVATING MEANS
Damas J. French, 1711 1st Ave. N.,
Grand Forks, N. Dak.
Filed Oct. 2, 1962, Ser. No. 227,850
8 Claims. (Cl. 172—456)

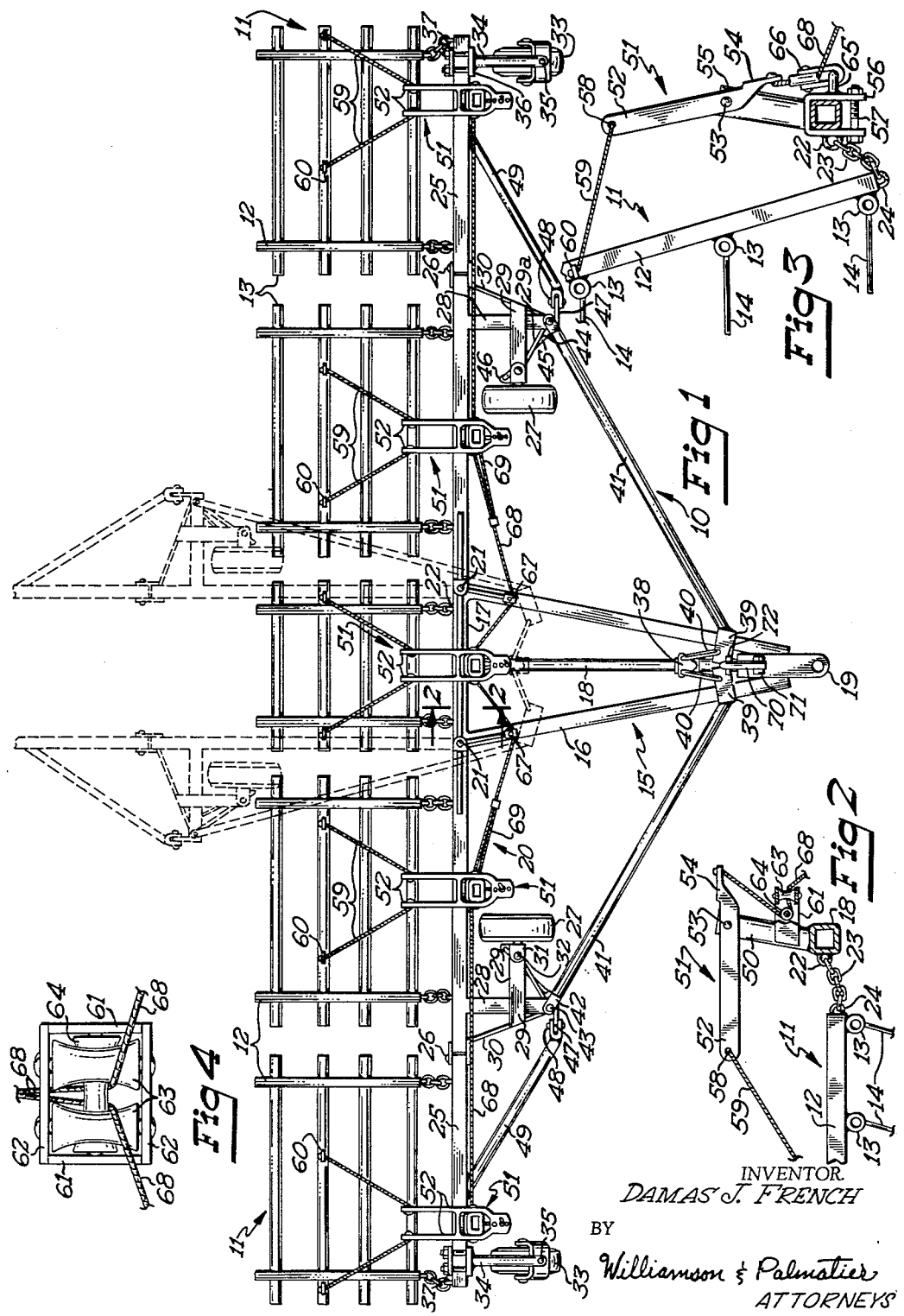

This invention relates to a foldable mobile tractor attachment and more specifically relates to a foldable drag cart for use in carrying harrow sections and the like.

An object of this invention is to provide a mobile tractor attachment, of simple and inexpensive construction, which is especially adapted to drag a plurality of harrow sections and also adapted to carry these sections in confined position for transport on the highway or the like, and including elevating means for automatically raising and lowering the harrow sections during folding and expansion of the attachment.

Another object of my invention is to provide a foldable mobile tractor attachment which includes elongate transversely extending frame sections for use in dragging a plurality of harrow sections and which is foldable inwardly into transport position in response to movement of the tractor and trailer along the ground, and elevating means which is automatically and sequentially operable during folding movement of the frame sections to the transport position to readily elevate the harrow sections to a confined position.

A further object of my invention is to provide a novel and improved foldable mobile tractor attachment of the class described having ground engaging wheels and mounting means therefor, and linkage mechanism which is operable in response to swinging movement of the frame sections to continuously turn the ground engaging wheels and to thereby readily facilitate swinging movement of the attachment to the transport position.

These and other objects and advantages of my invention will more fully appear from the following description made in connection with the accompanying drawings wherein like character references refer to the same or similar parts throughout the several views, and in which:

FIG. 1 is a top plan view of the drag cart illustrated in full lines in the opened condition, and showing in dotted lines the drag cart in folded position;

FIG. 2 is a cross sectional view on an enlarged scale taken approximately along line 2—2 of FIG. 1 and looking in the direction of the arrows;

FIG. 3 is a cross sectional view similar to FIG. 2 but with the harrow sections illustrated in the elevated position; and FIG. 4 is a fragmentary detailed view on an enlarged scale of a portion of the elevating mechanism.

One form of the present invention is shown in the accompanying drawings and is described herein. A drag cart, designated in general by the reference numeral 10, is illustrated in FIG. 1 in towing relation with respect to a plurality of harrow sections 11. These harrow sections are of conventional construction and each includes a pair of longitudinally extending frame members 12 which are interconnected by a plurality of transversely extending frame members 13, the latter having a plurality of harrow teeth 14 secured thereto and depending therefrom. The harrow sections 11 are connected to the drag cart and are arranged in side-by-side relation.

The drag cart 10 includes an elongate generally triangular shaped draft frame or tongue 15 including a pair of side frame elements 16 which converge forwardly and which are rigidly interconnected at their respective rear end portions by a transverse frame element 17. The tongue 15 also includes a central element which is rigidly connected to the median portion of the transverse frame element 17 and extending forwardly therefrom. It will be seen that the forward end of the central frame element 18 has the clevis 19 rigidly secured thereto and which is also secured to the front end of the side frame elements 16. The clevis 19 is adapted to be secured to the draw bar of a tractor or the like.

A pair of frame structures 20 are swingably connected to the tongue 15 adjacent the rear end thereof and these frame structures normally extend transversely outwardly from the tongue and in alignment with each other for dragging the harrow sections over the ground. It will be seen that the frame structures 20 are pivotally connected to the opposite ends of the transverse frame element 17 about pivot pins 21 and are adapted to swing rearwardly about the pivot in substantially longitudinal relation to the tongue 15.

The frame structures 20 and the transverse frame element 17 of the tongue 15 are provided with a plurality of rearwardly projecting eyes 22 at longitudinally spaced points therealong. Short link type chains 23 interconnect the eyes 22 with eyes 24 secured to the forward ends of the harrow frame members 12 so that a flexible connection is provided between the harrow cart and the harrows. This arrangement not only permits vertical floating movement of the harrow section during traversing movement over the surface of the ground but also allows the harrows to be readily elevated to a transport position.

Hingedly connected to the outer end of each of the frame structures 20 is a lateral section 25 as best seen in FIG. 1. These outer lateral frame sections 25 are hingedly connected to the outermost end of their associated frame structures by hinge connection 26 so that these outer sections are vertically swingable about a substantially horizontal axis extending in the direction of travel of the cart. These outer frame sections 25 are also provided with suitable eyes 22 which are connectible by short link chains to eyes 24 carried by the harrow sections to which these outer frame sections are connected. These outer frame sections 25 actually constitute extensions of the frame structures 20 and the hinge connection therebetween allows vertical floating movement between the outer frame sections and the associated frame structure to thereby permit traversal of uneven terrain.

Means are provided for supporting the frame structures 20 off the ground and for urging the same inwardly into substantially longitudinally extending relation to the tongue as the drag cart is folded. In the form shown such means includes a pair of ground engaging support wheels 27 which are mounted on their associated frame structures in substantially identical fashion. Each of these frame structures 20 has a rigid, forwardly extending frame element 28 fixedly secured thereto as by welding. A pair of vertically spaced-apart identical plates 29 are rigidly secured to the upper and lower surfaces of the frame elements 28 and project laterally therefrom. It will be noted that these plates 29 are disposed in substantially parallel relation with respect to the associated frame structures 20. A suitable obliquely arranged bracing bar 30 has one of its ends rigidly secured to the associated frame structure 20 and has the other end thereof secured to the forward end portion of the frame element 28 while the intermediate portion of the brace bar is rigidly secured to the plates 29. The innermost ends of the plates 29 associated with each frame element 28 has the upper and lower ears of a wheel mounting 31 swingably mounted thereon by pivot 32 to thereby permit turning of the wheel mounting on its vertical axis relative to the corresponding frame structure 20 and the tongue 15.

The outermost ends of each of the outer frame sections 25 is supported by a suitable caster wheel 33 as best seen in FIG. 1. It will be noted that the caster wheel 33 is pivotally connected to a standard 34 by means of a vertical pivot 35 thereby permitting the caster wheel to freely pivot about a substantially vertical axis. Standard 34 of each caster wheel has a rigid plate 36 fixedly attached to the rear end portion thereof which engages the front surface of the associated outer frame section 25. A rear plate 37 cooperates with the clamping plate 36 of each caster wheel standard and is clamped against the rear surface of the outer frame section by means of suitable bolt assemblies thereby permitting the caster wheel assembly to be detachably secured to the outer frame section.

A camming linkage mechanism is also provided for each frame section 20 to facilitate rearward swinging movement of the frame structure from the transverse operative position to the bolted transport position. This camming linkage mechanism also serves to turn the ground engaging wheels relative to the tongue 15 and relative to the corresponding frame structures 20 in response to rearward swinging of the frame structure so as to turn these ground engaging wheels 27 into planes extending obliquely to the central frame element 18 of the tongue and then into planes generally parallel to the central frame element 18 of the tongue as these frame structures 20 are swung rearwardly into the transport position. In the embodiment shown, the camming linkage mechanism includes a center sleeve member 38 which is mounted for sliding movement on the central frame element 18 of the tongue 15. The linkage mechanism also includes a pair of outer sleeve members 39 each being mounted on one of the side frame elements 16 of the tongue 15. It will be seen that the center sleeve member 38 is connected to the outer sleeve members 39 by suitable links 40 so that rearward movement of the center sleeve 38 will also cause corresponding rearward movement of the sleeve members 39.

Each of the outer sleeve members 39 has an elongate control or guiding link 41 rigidly secured thereto and projecting outwardly therefrom. The control links 41 are preferably constructed of rigid tubing in the form shown and each has its outer end bifurcated as at 42, this bifurcated end of each link being swingably connected on a pivot 43 to the forward terminal portion of the frame element 28. It will be seen that the outer end portions of each control link 41 is provided with an apertured ear 44 which has one end of a timing link 45 pivotally secured thereto. The other end of the timing link 45 is pivotally secured to an apertured ear 46 carried by the wheel mounting 31 so that the motion and force exerted by the control link 41 will be transmitted to the wheel mounting by the associated timing link.

It is also pointed out that in order to impart rigidity to the innermost end of the plates 29 which support each wheel mounting, a diagonal bracing member in the form of a bar 29a is provided which extends between and is rigidly connected to the outermost ends of each pair of upper and lower plates 29 and the forward end portion of the associated frame element 28. It will also be seen that each frame element 28 is provided with a bracket 47 which projects laterally outwardly therefrom and which is pivotally secured by a pivot 48 to the bifurcated end of a link 49, the latter being rigidly secured to the forward portion of one of the outer frame sections 25. Thus it will be seen that the motion and force transmitted through the control link 41 will also be transmitted through the control link 49 to the outer frame section 25 associated therewith and its corresponding caster wheel. This arrangement facilitates swinging movement of one of the frame structures and its associated outer frame section since some of the force will be transmitted directly to the associated outer frame section.

Means are also provided for automatically and sequentially raising the harrow sections 11 from the normal horizontal drag position to an elevated transport position in response to folding of the drag cart. This elevating mechanism includes a central mounting member or post 50 which is rigidly affixed as by welding to the median upper surface portion of the transverse frame element 17 of the tongue 15. This mounting post is inclined slightly forwardly and is preferably secured to the central frame element 18 as by welding or the like. An elevating arm 51 is pivotally connected to the upper terminal portion of the mounting post 50 and it will be seen that this elevating arm includes a pair of arm elements 52 which are rigidly interconnected and which are disposed in substantially parallel relation. The arm elements 52 are positioned on opposite sides of the upper terminal portion of the mounting post 50 and a pivot 53 secures the arm elements to the mounting posts 50 to permit vertical swinging movement of the elevating arm about a substantially horizontal axis spaced above and substantially parallel to the central frame element 17. The forward terminal portions of the arm elements 52 are rigidly interconnected by a substantially flat attachment portion 54 which is provided with a plurality of longitudinally aligned apertures therein.

Each of the frame structures 20 and each of the outer frame sections 25 is provided with a mounting post or member 55 which is disposed in substantially parallel relation with respect to the central mounting post 50 and which is similar in construction to the central mounting post. It will be noted, that each of the mounting posts 55 are detachably mounted upon its associated frame structure or outer frame section to thereby permit removal thereof or adjustment along its supported structure as such. To this end it will be seen that each of the mounting posts 55 is provided with an inverted U-shaped mounting bracket 56 rigidly secured to the lower end thereof. Suitable bolt means 57 extend through suitable apertures in the legs of each of the U-shaped mounting brackets 56 to detachably clamp the post 55 to their associated mounting structure or outer frame section.

Each of these mounting posts 55 is provided with an elevating arm 51 including a pair of arm elements 52 pivotally connected to the post 55 by a pivot 53. Each of the elevating arms 51 for these mounting posts 55 also have an attachment portion 54 joining the arm elements 52 at the forward ends thereof, these attachment portions having a plurality of longitudinally aligned apertures therein.

It will be seen that each of the arm elements 52 of each elevating arms 51 has an aperture 58 in the rear portion thereof. A pair of flexible elements in the form of ropes as illustrated extend between and are connected to each elevating arm and each harrow section associated therewith. It will be seen that each of these flexible elements 59 of each pair has one end secured to one of the arm elements 52 of its associated elevating arm and has its other end secured to suitable eyes 60 mounted on one of the center transverse frame elements 13 of each harrow section 11. Referring now to FIG. 2 it will be seen that when the elevating arms 51 are disposed in their lowered horizontal position, the harrow sections will also be disposed in the horizontal relation so that the teeth thereof will engage the surface of the ground. It will further be noted that when the elevating arms 51 are vertically swung to their elevated position, the harrow sections will be vertically elevated about their flexible connection with the drag cart. To this end it will be noted that the flexible elements or ropes 59 are connected to their associated harrow sections rearwardly of the flexible coupling between the harrow section and its associated frame structure or outer frame sections. Thus the rear ends of the harrow sections will be tilted during the elevating operation.

The harrow elevating mechanism also includes means for sequentially pivoting the elevating arms 51 so that the harrow sections carried by the outer frame sections 25 will be elevated to the transport position prior to elevation of the harrows carried by the frame structures 20. This arm pivoting means is also operable to cause the central elevating arm to be the last to be swung to the elevated position during the folding operation of the drag cart. Referring now to FIG. 2 it will be seen that the central mounting post 50 has a mounting bracket secured thereto and which includes a pair of substantially identical bracket plates 61 secured to opposite sides of the post 50 and projecting forwardly therefrom. It will be noted that these bracket plates 61 are disposed in vertical planes and are arranged in substantially parallel relation with respect to each other. Rigidly affixed to the outer end portions of the bracket plates 61 are upper and lower mounting plates 62 which are also disposed in substantially parallel relation with respect to each other. A pair of vertically disposed rollers 63 each has its respective axle extending between and connected to the upper and lower bracket plates 62 so that the rollers 63 are revolvable about substantially vertical axes. Positioned rearwardly of the vertical rollers 63 and extending between and revolvably supported from the bracket plates 61 is a horizontal roller 64 as best seen in FIGS. 2 and 4.

Referring now to FIG. 3 it will be seen that each mounting bracket 56 has a U-shaped pulley mounting member 65 rigidly secured to the forwardmost leg thereof. This U-shaped pulley mounting member for each bracket 56 supports a pulley unit 66 thereon. It will also be seen that each of the side frame elements 16 of the tongue 15 has a unit 67 mounted thereon. It will be noted that these pulley units 67 are mounted outwardly and forwardly of the pulley assembly defined by the vertical rollers 63 and the horizontal rollers 64.

A pair of elongate flexible members 68 are provided for vertically shifting the elevating arms and each of these flexible members 68 has one of its ends secured to one of the outermost elevating arms 51. Thus it will be noted that the outermost end of each rope projects through one of the apertures of its associated elevating arm attachment portion and extends downwardly therefrom around the pulley unit 66 carried by the associated mounting post 55. The flexible element or rope 68 is then trained around the pulley unit 66 carried by the mounting post 55 mounted on the frame structure 20 and is thereafter trained around the pulley unit 67 on the side frame element 16 of the tongue 15. The other end portion of the flexible element or rope 68 is first trained around one of the vertical pulleys 63 and thereafter is trained over the horizontal pulley 64, the end of the rope being secured to the attachment portion of the elevating arm 51 carried by the center mounting post 50. It is pointed out that the respective innermost ends of the rope 68 extend through the same aperture in the attachment portion of the central elevating arm so that the points of connection of the ropes are substantially the same with respect to the center elevating arm.

Each of the elevating arms 51 carried by the frame structures 20 have one end of a relatively short flexible element or rope 69 secured thereto, the other end of the ropes 69 being secured to a flexible element 68 at a point located between the associated mounting post 55 and the pulley units 67. Thus when tension is exerted on the rope 68, so that the direction of the tension force is exerted inwardly, the flexible element or rope 69 will also be tensioned. It will therefore be seen that when the harrow cart is collapsed or folded to the transport position from the operative expanded position, the ropes or flexible element 68 will be progressively tensioned to thereby cause elevation of the harrow sections 11 during this folding operation. Conversely when the drag cart is expanded from the folded transport position, the tension on the flexible element 68 will be progressively lessened therefor causing lowering of the harrow sections to the drag position.

Means are also provided for releasably locking the drag cart 10 in the expanded position and to this end a hook shaped lock element 70 is pivotally connected between upstanding ears 71 mounted on the clevis 19 for vertical swinging movement about a substantially horizontal axis. The upper portion of each of the outer sleeve members 39 are provided with upstanding lock engaging elements or lugs 72 adjacent the front inner peripheral areas thereof. These locking engaging elements or lugs 72 are engageable with the lock element 70 when the drag cart is in the expanded position thus preventing rearward swinging movement of the frame structures 20 about their respective pivots 21. When the lock element 70 is disengaged from the lock engaging element 72, the frame structures 20 are therefore free to pivot about their respective pivots. Although not illustrated in the drawings, the lock element 70 may be readily shifted between locked and released condition by an actuating mechanism located adjacent the operator in the tractor. Such actuating mechanism may include an electro-mechanical system including a solenoid or may include a mechanical linkage.

During operation of the trailer attachment or drag cart comprising the instant invention, the drag cart will be in the expanded position so that the locking element will be arranged in engaging locked relation with respect to the lock engaging element 72. The clevis 19 will be connected to the draw bar of a tractor so that the drag cart will be towed thereby. When the drag cart is in the expanded position, the elevating arms will be disposed substantially horizontally and the rope element 68 will be in the untensioned condition thereby permitting the harrow sections to be disposed in ground engaging horizontal operative relation. Thus when the tractor is moved forwardly, the drag cart will be towed thus permitting the harrowing operation by the teeth of the harrow sections. When it is desirable to fold the drag cart 10 to the transport position, the lock element 70 is disengaged from the lock engaging element 72 and the drag cart is then pulled forwardly by the tractor.

Since the harrow sections 11 will be disposed in engaging relation with respect to the ground, these harrow sections will produce a drag or inertial load so that the frame structures 20 will pivot about their respective pivots 21. This swinging movement also causes sliding movement of the center sleeve member 38 along the frame element 18 and sliding movement of the outer sleeve members 39 along the side frame element 16 of the tongue 15. This produces a swinging of the control links 41 and the timing links 45 which causes a turning of the wheel mounting 31 and the wheels 27 into oblique relation with respect to the tongue. The wheels are then oriented so as to converge with each other in forward movement along the ground. This converging motion of the wheels tends to urge the frame structures 20 inwardly toward their second position as indicated in dotted line configuration in FIG. 1. As the frame structures 20 move toward their second position, the sliding of the sleeves 38 and 39 and the swinging of the linkage mechanism continues and as the frame structures approach the transport position wherein they are substantially parallel to each other, the linkage mechanism causes the wheel mountings and wheels to turn again so as to orient the wheels in substantially parallel relation with the tongue and the wheels are thereby oriented for travel along the highway.

During this swinging movement of the frame structures 20 from the expanded transverse position to the folded longitudinal position, the flexible elements or rope 68 are progressively tensioned. Thus during the first movement of the frame structures 20 and their associated outer frame sections 25 will produce immediate longitudinal tensioning of the rope 68 so that the elevating operation is simultaneously carried out with the folding operation. Because of the particular arrangement of the pulley units, the elevating arms carried by the respective outer frame sections will be caused to pivot about their respective axis of pivot prior to the vertical swinging movement of the other elevating arms. Therefore the outer harrow sections will be partially elevated before the harrow sections carried by the frame structures 20 are caused to swing vertically about their coupling connections with the frame structures. To this end, it is pointed out that the flexible rope elements 69 may be of such a length so as to permit substantial raising or elevating of the harrow sections caried by the frame sections 25 prior to vertical swinging movement thereof. However, in the instant embodiment, the elevating arms 51 carried by the frame structures 20 will begin vertical swinging movement thereof prior to complete elevation of the outermost harrow sections.

Thus during the initial swinging movement of the frame structures and their associated frame sections, the outermost harrow sections will be elevated to a predetermined point and then the harrow sections carried by the frame structures 20 will begin vertical swinging movement. Continued swinging movement of the frame structures towards the folded position, will thereafter cause the harrow sections carried by the frame structures 20 to be continuously elevated at which time the outer harrow sections will approach their final elevated position. The elevating arm carried by the central mounting post 50 will then be caused to pivot about its axis of pivot and swing vertically thereby causing corresponding vertical swinging movement of the central harrow sections 11 during the final swinging movement of the frame structures to the transport position. With this arrangement it will be seen that the harrow sections carried by the frame structures 20 and the frame sections 25 will be elevated to a position so that there will be no interference with elevation of the central harrow sections. When the drag cart is in the folded or collapsed position, the harrow sections will also be elevated to an upstanding substantially vertical position as illustrated in FIG. 3 so that the entire apparatus comprises a structure of relatively small compass in this transport position. When it is desirable to expand or unfold the drag cart, and also to cause corresponding lowering of the harrow sections, the tractor is reversed by exerting a rearward thrust on the tongue which tends to urge the tongue through the sleeves 38 and 39 and which in turn causes turning of the tongue engaging wheels 27 first into oblique relation to the tongue and then into the position illustrated in full lines in FIG. 1. The frame structures 20 will also be caused to swing relative to the tongue from the folded position to the expanded position and this movement also causes release of the tension on the rope or flexible elements 58 and flexible elements 69. The weight of the harrows tends to cause lowering of the harrows from the elevated position to the horizontal drag position. Thus the harrow will assume the expanded position as illustrated in full line in FIG. 1 and the lock element 70 will thereafter be shifted into engaging relation with the lock engaging element 72. The drag cart and towed harrow sections will then be in condition for operation.

The provision of a plurality of longitudinally aligned structures in the attachment portions 54 of each of the elevating arms 51 permits an adjustment of the rope with respect to its associated attached relation with respect to the elevating arms. Thus the relative amount of movement of the frame structures and associated outer frame sections prior to elevating movement of the associated elevating arms may be varied.

It will therefore be seen that I have provided a new and improved drag cart or trailer attachment for tractors and the like which normally extends transversely outwardly from the tractor but which is readily foldable into a transport position by pulling the attachment along the ground with the tractor which causes the elevating mechanism on the attachment to automatically elevate the towed harrow sections or the implements connected to the drag cart, into an elevated position.

It will also be seen from the preceding paragraphs that my novel and improved harrow and drag cart has a uniquely arranged elevating mechanism which not only permits automatic elevation of the harrow sections during the folding operation but is so arranged and constructed that the harrow sections are arranged in a sequence to avoid interfering engagement of one harrow section with another.

Thus it will be seen from the foregoing that I have provided a novel and improved harrow drag cart which is not only of simple and inexpensive construction but one which functions in a more efficient manner than any heretofore known comparable devices.

It will of course be understood that various changes may be made in the form, details, arrangement and proportions of the various parts without departing from the scope of my invention.

What is claimed is:

1. A tractor attachment for dragging and transporting harrow sections and the like, said attachment including
    a fore-and-aft tongue connectible to a tractor,
    an elongate frame structure extending transversely of the tongue and being swingably connected thereto for swinging movement into a transport position in generally longitudinal relation to the tongue, said frame structure having coupling connections thereon for ready connection to a plurality of trailing harrow sections disposed rearwardly of the frame structure and arranged in side-by-side relation with respect to each other,
    means for interlocking said frame structure in transversely extending relation with said tongue,
    a pair of ground-engaging wheels on opposite sides of said tongue,
    linkage mechanism interconnecting said tongue and said frame structure and cooperating with the latter when said interlocking means is released to cause swinging movement of the frame structure to the transport position during forward movement of said tongue,
    and elevating mechanism mounted on said tongue and frame structure and being connectible to trailing harrow sections at points rearwardly of the coupling connections between trailing harrow sections and the frame structure, and being operated in response to swinging movement of said frame structure towards the transport position to cause upward swinging movement of such harrow sections about their respective coupling connections with the frame structure.

2. A tractor attachment for dragging and transporting harrow sections and the like, said attachment including
    a fore-and-aft tongue connectible to a tractor,
    an elongate frame structure extending transversely of the tongue and being swingably connected thereto for swinging movement into a transport position in generally longitudinal relation to the tongue, said frame structure and tongue having coupling connections thereon for ready connection to a plurality of trailing harrow sections disposed rearwardly of the frame structure and arranged in side-by-side relation with respect to each other,
    means for interlocking said frame structure in transversely extending relation with said tongue,
    a pair of ground engaging wheels on opposite sides of said tongue,
    linkage mechanism interconnecting said tongue and said frame structure and cooperating with said frame structure when said interlocking means is released to cause swinging movement of the frame structure to the transport position during forward movement of the tongue,
    and an elevating mechanism for automatically raising and lowering a plurality of trailing harrow sections in response to swinging movement of the frame structure, said mechanism including a plurality of spaced-apart elevating arms each being pivotally mounted on said frame structure for vertical swinging movement about a substantially horizontal axis between a lowered substantially horizontal position and an upstanding elevated position about said substantially horizontal axis spaced above and substantially parallel to the frame structure, means for connecting each of said arms to one of a plurality of trailing harrow sections at points spaced rearwardly of the coupling connection between the corresponding harrow section and the associated frame structure and tongue, and means operatively connected with said arms and being automatically operated in response to swinging movement of said frame structure towards the transport position to cause swinging movement of the arms from the lowered position to the elevated position to thereby cause corresponding upward swinging movement of trailing harrow sections about their respective coupling connections with the frame structure and the tongue.

3. The structure as defined in claim 2 wherein said last mentioned means comprises an elongate flexible element connected with each of said elevating arms, and means on said frame structure and tongue for tensioning said flexible element in response to swinging movement of said frame structure towards the transport position to cause vertical swinging movement of the arms from the lowered position to the elevated position and to thereby cause corresponding upward swinging movement of trailing harrow sections.

4. A tractor attachment for dragging and transporting harrow sections and the like, said attachment including a fore-and-aft tongue connectible to a tractor, an elongate frame structure extending transversely of the tongue and being swingably connected thereto for swinging movement into a transport position in generally longitudinal relation to the tongue, said frame structure and tongue having coupling connections thereon for connection to a plurality of trailing harrow sections disposed rearwardly of the frame structure and arranged in side-by-side relation with respect to each other, means for interlocking said frame structure in transversely extending relation with the tongue, a pair of ground engaging wheels on opposite sides of said tongue, linkage mechanism interconnecting said tongue and said frame structure and cooperating with said frame structure when said interlocking means is released to cause swinging movement of the frame structure to the transport position during forward movement of said attachment, elevating mechanism for automatically raising and lowering trailing harrow sections in response to swinging movement of said frame structure, said mechanism including a plurality of spaced-apart elevating arms mounted on said frame structure and tongue and each being vertically swingable about a substantially horizontal axis between a lowered substantially horizontal position and an upstanding elevated position about said substantially horizontal axis spaced above and substantially parallel to the frame structure, means for connecting each of said arms with one of a plurality of trailing harrow sections at points rearwardly of the harrow coupling connections with the attachment, a flexible element connected with each of said elevating arms, a plurality of pulley units mounted on said frame structure and tongue and being engaged by said flexible element, said pulley unit cooperating with the arms and said flexible element in response to swinging movement of said frame structure towards the transport position to cause vertical swinging movement of the arms from the lowered position to the elevated position to thereby cause corresponding upward swinging movement of trailing harrow sections about their respective coupling connections with the frame structure.

5. A tractor attachment for dragging and transporting harrow sections, said attachment including a fore-and-aft tongue connectible to a tractor, an elongate frame structure extending transversely of the tongue and being swingably connected thereto for swinging movement into a transport position in generally longitudinal relation to the tongue, said frame structure and tongue having coupling connections thereon for connection to a plurality of trailing harrow sections disposed rearwardly of the frame structure and arranged in side-by-side relation with respect to each other, means for interlocking said frame structure in transversely extending relation with said tongue, a pair of ground-engaging wheels on opposite sides of said tongue, linkage mechanism interconnecting said tongue and said frame structure and cooperating with said frame structure when said interlocking means is released to cause swinging movement of the frame structure to the transport position during forward movement of said tongue, elevating mechanism for automatically raising and lowering trailing harrow sections in response to swinging movement of the frame structure, said elevating mechanism including a plurality of spaced-apart elevating arms pivotally mounted on the frame structure and tongue and each being vertically swingable between a lowered substantially horizontal position and an upstanding elevated position about a substantially horizontal axis spaced above and substantially parallel to the frame structure, an elongate flexible element connected with each of said elevating arms, a plurality of pulley units mounted on said frame structure and tongue and being engaged by said flexible element, said pulley units cooperating with said elevating arms in response to swinging movement of said frame structure toward the transport position to tension said flexible element and to thereby sequentially cause vertical swinging movement of the elevating arms on the frame structure from the lowered position to the elevated position prior to causing corresponding vertical swinging movement of the elevating arm on said tongue whereby the outermost of a plurality of trailing harrow sections will be elevated prior to elevating movement of the remaining harrow sections.

6. A tractor attachment for dragging and transporting harrow sections, said attachment including a fore-and-aft tongue connectible to a tractor, a pair of elongate frame structures extending transversely of the tongue in opposite directions and being swingably connected thereto for swinging movement into a transport position in generally longitudinal relation to the tongue in substantially parallel relation with respect to each other, said frame structures and tongue having coupling connections thereon for connection to a plurality of trailing harrow sections disposed rearwardly of the frame structures and tongue and arranged in side-by-side relation with respect to each other, means for interlocking said frame structures in transversely extending relation with said tongue, a pair of ground engaging wheels on opposite sides of the tongue and each being disposed adjacent and connected to one of said frame structures, a pair of linkage mechanisms each interconnecting said tongue and one of said frame structures, each of said linkage mechanisms cooperating with its associated frame structure when said interlocking means is released to cause swinging movement of the frame structure to the transport position during forward movement of the tongue, elevating mechanism for automatically raising and lowering the harrow sections in response to swinging movement of said frame structures, said mechanism including a plurality of spaced-apart elevating arms pivotally mounted on said frame structures and each elevating arm being vertically swingable between a lowered substantially horizontal position and an upstanding elevated position about a substantially horizontal axis spaced above and substantially parallel to the frame structures, a central elevating arm pivotally mounted on said tongue for vertical swinging movement between a lowered substantially horizontal position and an upstanding elevated position about a substantially horizontal axis spaced above and substantially parallel to the frame structures, means for connecting each of said elevating arms with one of a plurality of trailing harrow sections at points rearwardly of the coupling connections of such harrow sections with the attachment, a pair of elongate flexible elements each being connected with said elevating arms on one of said frame structures and each being connected to said central elevating arm on the tongue, and means for tensioning said flexible elements in response to swinging movement of said frame structures towards the transport position to cause swinging movement of trailing elevating arms from the lowered position to the elevated position and to thereby cause upward swinging movement of the harrow sections about their respective coupling connections with said attachment.

7. The structure as defined in claim 6 wherein said tensioning means for said flexible elements comprises a plurality of pulley units mounted on said frame structures and tongue and being engaged with said flexible elements and cooperating with said elevating arms in response to swinging movement of said frame structures toward the transport position to tension said flexible element.

8. A tractor attachment for dragging and transporting harrow sections, said attachment including a fore-and-aft tongue connectible to a tractor, a pair of elongate frame structures extending transversely of the tongue in opposite directions and being swingably connected thereto for swinging movement into a transport position in generally longitudinal relation to the tongue and in substantially parallel relation with respect to each other, said frame structures and tongue having coupling connections thereon for connection to a plurality of harrow sections disposed rearwardly of the frame structures and tongue and arranged in side-by-side relation with respect to each other, means for interlocking said frame structures in transversely extending relation with said tongue, a pair of ground-engaging wheels on opposite sides of the tongue and each being disposed adjacent and connected to one of said frame structures, a pair of linkage mechanisms each interconnecting said tongue and one of said frame structures, each of said linkage mechanisms cooperating with its associated frame structure when said interlocking means is released to cause swinging movement of the frame structure to the transport position during forward movement of the tongue, elevating mechanism for automatically raising and lowering the harrow sections in response to swinging movement of the frame structures, said elevating mechanism including a plurality of spaced-apart elevating arms pivotally mounted on said frame structures and each arm being vertically swingable between a lowered substantially horizontal position and an upstanding elevated position about a substantially horizontal axis spaced above and substantially parallel to the frame structures, a central elevating arm pivotally mounted on said tongue for vertical swinging movement between a lowered substantially horizontal position and an upstanding elevated position about a substantially horizontal axis spaced above and substantially parallel to the frame structures, means for connecting each of said elevating arms with one of a plurality of trailing harrow sections at points spaced rearwardly of the coupling connections of such harrow sections with the attachment, a pair of elongate flexible elements each being connected with said elevating arms on one of said frame structures and each being connected to said central elevating arm on the tongue, a plurality of pulley units mounted on said frame structures and tongue and being engaged by said flexible elements, said pulley units cooperating with said elevating arms in response to swinging movement of said frame structures toward the transport position to tension said flexible elements to thereby sequentially cause vertical swinging movement of the elevating arms on the frame structure from the lowered position to the elevated position prior to causing corresponding vertical swinging movement of the elevating arm on said tongue whereby the outermost of a plurality of side-by-side trailing harrow sections will be elevated prior to elevating movement of a harrow section connected to said tongue.

References Cited in the file of this patent

UNITED STATES PATENTS

| | | |
|---|---|---|
| 655,483 | Graham | Aug. 7, 1900 |
| 2,306,127 | Johnston et al. | Dec. 22, 1942 |
| 2,995,385 | Lohrman et al. | Aug. 8, 1961 |
| 3,072,201 | Brakhage | Jan. 8, 1963 |